(12) United States Patent
Biazetti et al.

(10) Patent No.: US 10,902,573 B2
(45) Date of Patent: Jan. 26, 2021

(54) COGNITIVE VALIDATION OF DATE/TIME INFORMATION CORRESPONDING TO A PHOTO BASED ON WEATHER INFORMATION

(71) Applicant: International Business Machines Corporation, Armonk, NY (US)

(72) Inventors: Ana C. Biazetti, Cary, NC (US); Jose A. Nativio, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/993,639

(22) Filed: May 31, 2018

(65) Prior Publication Data

US 2019/0370951 A1 Dec. 5, 2019

(51) Int. Cl.
*G06T 7/00* (2017.01)
*G06K 9/62* (2006.01)
*G06K 9/00* (2006.01)
*G01W 1/00* (2006.01)
*G06N 20/00* (2019.01)

(52) U.S. Cl.
CPC .......... *G06T 7/0002* (2013.01); *G01W 1/00* (2013.01); *G06K 9/00664* (2013.01); *G06K 9/6257* (2013.01); *G06K 9/6277* (2013.01); *G06K 9/6288* (2013.01); *G06N 20/00* (2019.01); *G06K 2209/27* (2013.01); *G06T 2207/30192* (2013.01)

(58) Field of Classification Search
CPC .......... G06K 9/00664; G06K 9/6257; G06K 9/6277; G06K 9/6288; G06K 2209/27; G06T 7/0002; G06T 2207/30192; G06N 20/00; G01W 1/00

USPC .......... 382/159, 160, 218
See application file for complete search history.

(56) References Cited

U.S. PATENT DOCUMENTS

| | | |
|---|---|---|
| 8,538,696 B1 | 9/2013 | Cassanova |
| 9,244,167 B1 | 1/2016 | Oransky et al. |
| 9,460,348 B1 * | 10/2016 | Adam ............ G06K 9/00677 |
| 9,465,987 B1 | 10/2016 | Bell et al. |
| 9,792,522 B2 | 10/2017 | Shen et al. |

(Continued)

OTHER PUBLICATIONS

Mack. "This Google A.I. Can Figure Out Where Almost Any Photo Was Taken". Forbes Science. Feb. 25, 2016 @ 04:09 PM. <https://www.forbes.com/sites/ericmack/2016/02/25/this-google-a-i-can-figure-out-where-that-photo-was-taken/#1f1b64aa6a2f>.

(Continued)

*Primary Examiner* — Daniel G Mariam
(74) *Attorney, Agent, or Firm* — Edward Li

(57) ABSTRACT

A method, a computer program product, and a computer system for cognitive validation of date/time information based on weather information. A computer trains a machine learning model to determine weather properties in images, by utilizing training images with verified metadata and historical weather data. The computer receives an image taken at a specific location and at an alleged time. The computer generates summarized weather hypotheses with a probability distribution, based on probabilities and confidence levels of the one or more weather hypotheses. The computer verifies the alleged time, by using the machine learning model. The machine learning model is used to determine weather properties in the image and to compare the weather properties in the image to known weather information at the specific location and at the alleged time.

15 Claims, 7 Drawing Sheets

(56) References Cited

U.S. PATENT DOCUMENTS

| | | | |
|---|---|---|---|
| 2016/0203137 A1 | 7/2016 | Sabah et al. | |
| 2016/0286132 A1 | 9/2016 | Kim et al. | |
| 2016/0334546 A1 | 11/2016 | Ma et al. | |
| 2017/0134319 A1* | 5/2017 | Ramsey | H04L 51/08 |
| 2019/0188773 A1* | 6/2019 | Chu | G01J 5/00 |
| 2019/0318502 A1* | 10/2019 | He | G06K 9/6218 |
| 2019/0347780 A1* | 11/2019 | Asano | G06T 7/0002 |

OTHER PUBLICATIONS

Naaman et al. "Context Data in Geo-Referenced Digital Photo Collections". MM'04, Oct. 10-16, 2004, New York, New York, USA. pp. 196-203.

"Exif—Wikipedia" Edited by 125.16.167.58 (talk) at 05:27, Nov. 9, 2016. <https://en.wikipedia.org/w/index.php?title=Exif&oldid=748613145>.

Weyand et al. "PlaNet—Photo Geolocation with Convolutional Neural Networks—Google AI". European Conference on Computer Vision 2016. Google. <https://ai.google/research/pubs/pub454882016>.

* cited by examiner

COGNITIVE VALIDATION OF DATE/TIME INFORMATION CORRESPONDING TO A PHOTO BASED ON WEATHER INFORMATION

BACKGROUND

The present invention relates generally to cognitive validation of date/time information corresponding to a photo, and more particularly to the cognitive validation based on weather information.

Digital photos and images typically include Exif metadata which is provided by a camera. The Exif metadata includes information such as a location where a photo is taken and a date/time when a photo is shot. However, the information may not be included if the camera is configured to do so, or a certain program removes the information or even adds incorrect metadata to the photo. Thus, it is hard to determine the authenticity of the photo for a given time and/or location.

SUMMARY

In one aspect, a method for cognitive validation of date/time information corresponding to a photo based on weather information is provided. The method comprises training, by a computer, a machine learning model to determine weather properties in images, by utilizing training images with verified metadata and historical weather data. The method further comprises receiving, by the computer, an image taken at a specific location and at an alleged time. The method further comprises verifying, by the computer, the alleged time, by using the machine learning model, wherein the machine learning model is used to determine weather properties in the image, wherein the machine learning model is used to compare the weather properties in the image to known weather information at the specific location and at the alleged time.

In another aspect, a computer program product for cognitive validation of date/time information corresponding to a photo based on weather information is provided. The computer program product comprises one or more computer-readable tangible storage devices and program instructions stored on at least one of the one or more computer-readable tangible storage devices. The program instructions are executable to: train, by a computer, a machine learning model to determine weather properties in images, by utilizing training images with verified metadata and historical weather data; receive, by the computer, an image taken at a specific location and at an alleged time; and verify, by the computer, the alleged time, by using the machine learning model, wherein the machine learning model is used to determine weather properties in the image, wherein the machine learning model is used to compare the weather properties in the image to known weather information at the specific location and at the alleged time.

In yet another aspect, a computer system for cognitive validation of date/time information corresponding to a photo based on weather information is provided. The computer system comprises one or more processors, one or more computer readable tangible storage devices, and program instructions stored on at least one of the one or more computer readable tangible storage devices for execution by at least one of the one or more processors. The program instructions are executable to train, by a computer, a machine learning model to determine weather properties in images, by utilizing training images with verified metadata and historical weather data. The program instructions are further executable to receive, by the computer, an image taken at a specific location and at an alleged time. The program instructions are further executable to verify, by the computer, the alleged time, by using the machine learning model, wherein the machine learning model is used to determine weather properties in the image, wherein the machine learning model is used to compare the weather properties in the image to known weather information at the specific location and at the alleged time.

DETAILED DESCRIPTION

Existing solutions try to guess a location of a photo by identifying some key visual attributes and matching the visual attributes with a large database of geolocated images. The existing solutions and the present invention work on different domains: the existing solutions tries to identify where the photo has been taken, while embodiments of the present invention validate date/time information corresponding to a photo based on weather information.

Figure 1:
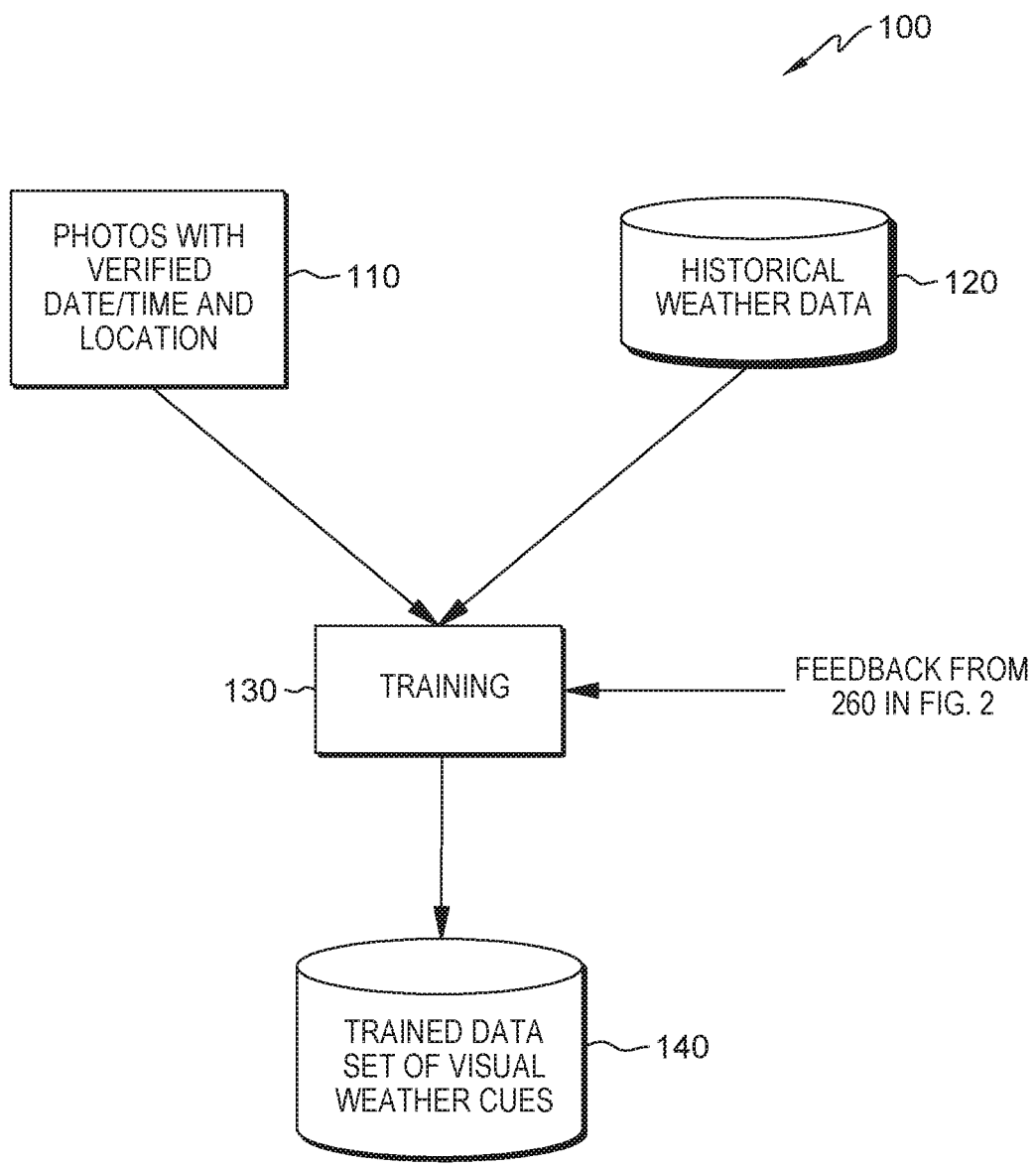
FIG. 1 is a diagram illustrates a process of training a machine learning model, in accordance with one embodiment of the present invention.

FIG. 1 is a diagram illustrates process 100 for training a machine learning model, in accordance with one embodiment of the present invention. As shown in FIG. 1, the first input to training 130 is one or more photos 110 with verified dates/times and locations. The second input to training 130 is historical weather data 120. Training 130 uses image recognition cognitive technique to identify different weather cues contained in the one or more photos and then associates the weather cues with historical weather data 120. The results of training 130 is stored in trained data set 140 of visual weather cues. Training 130 receives feedback from module 260 shown in FIG. 2. Through the feedback form module 260 shown in FIG. 2, trained data set 140 of visual weather cues is continuously updated with visual weather cues from verified photos whose confidence levels of cognitive validation of date/time information are high.

Referring to FIG. 1, historical weather data 120 is obtained from sources such as weather stations and satellites. Historical weather data 120 is obtained in regular periods of time (e.g., hourly). For example, historical weather data 120 obtained include but are not limited to temperature of air, dewpoint, relative humidity of air, feels like temperature, heat index, wind chill, barometric pressure, cloud cover, horizontal visibility, wind speed and direction, wind gust speed, precipitation for the last hour, snow accumulation for the last hour, UV index, water temperature, wave period and height, swell period, and height and direction. Historical weather data 120 also includes recent weather data at a certain location. The recent weather data at a certain location is within a predetermined time period before an alleged date/time (or to-be-verified date/time) of a photo; for example, the recent weather data includes but is not limited to high temperature in the last 24 hours, low temperature in the last 24 ours, pressure tendency (a change in barometric pressure readings over the last 24 hours expressed as an integer), and precipitation amount in the last 24 hours. The recent weather data is important for determining resulting weather signs from a recent weather phenomenon, for example puddles due to recent rain.

Trained data set 140 includes visual weather cues. Examples of the visual weather cues are presented in Table 1 as follows.

TABLE 1

| Weather Properties | Visual Weather Cues |
| --- | --- |
| Temperature | People's clothing (range of temperature); Condition of vegetation (season) |
| Cloud Coverage | Visual of the sky or incident light (clear, haze, partially cloudy, stormy); Type of clouds (cirrus, cumulus) |
| Precipitation | Type and intensity of precipitation (rain, drizzle, hail, snow) |
| Wind Speed | Perceived movement on flags, trees, people's hair, waves (estimated wind speed) |
| Recent weather events | Puddles (rain); Snow on the ground; Dry or wilted vegetation (drought); Swollen river (excessive rain) |

Figure 2:
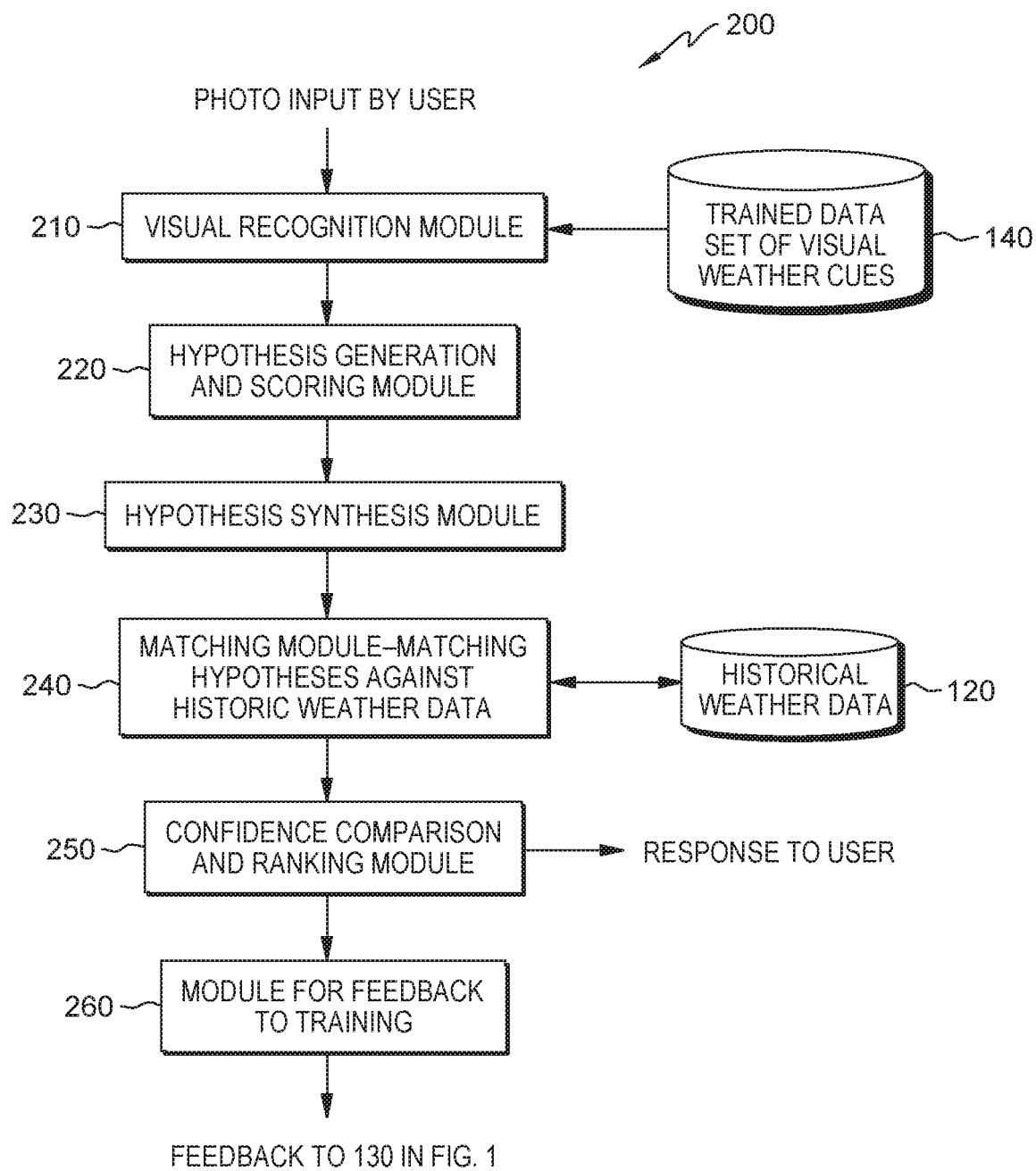
FIG. 2 is a diagram showing modules for cognitive validation of date/time information corresponding to a photo based on weather information, in accordance with one embodiment of the present invention.

FIG. 2 is a diagram showing modules 200 for cognitive validation of date/time information corresponding to a photo based on weather information, in accordance with one embodiment of the present invention. Visual recognition module 210 receives from a user a photo with information of a certain location and information of alleged date/time when the photo has been taken. Visual recognition module 210 loads visual weather cues from trained data set 140. Visual recognition module 210 classifies and translates visual elements in the photo by matching image aspects against visual weather cues from trained data set 140. Visual recognition module 210 generate pieces of weather evidence. The pieces of weather evidence go through hypothesis generation and scoring module 220. Multiple parallel hypotheses are generated; one hypothesis for one piece of weather evidence. Then, the resulting multiple parallel hypotheses go through hypothesis synthesis module 230. Hypothesis synthesis module 230 generates summarized weather hypotheses. Matching module 240 matches the summarized weather hypotheses against historic weather data 120 to verify the information of alleged date/time which has been provided by the user. Confidence comparison and ranking module 250 ranks, based on confidence levels of matching, the summarized weather hypotheses. Confidence comparison and ranking module 250 provides the user with a response verifying whether the alleged date/time given by the user is correct with an associated confidence. When confidence of the alleged date/time of the photo being correct is high, module 260 for feedback feeds the photo and its metadata to training 130 shown in FIG. 1.

In another embodiment, visual recognition module 210 receives from a user a photo taken at a certain location; however, the user does not know a certain time when the photo has been taken and provides a time range when the photo has been taken. Matching module 240 matches the summarized weather hypotheses against historic weather data 120 in a larger time frame and looks for dates/times that best match the summarized weather hypotheses. In this embodiment, matching module 240 takes advantage of photo albums and multiple photos that have been taken at the same location within a relative short period of time. Matching module 240 responds to the user with a set of dates/times with associated confidences. For example, for a beach photo, matching module 240 may respond that the photo was taken on Jul. 17, 2015 with a 70% confidence, on Jul. 17, 2015 with a 50% confidence, and on Jul. 18, 2015 with a 40% confidence. In yet another embodiment, matching module 240 responds to the user with hypotheses based on the weather cues of the photo; for example, matching module 240 provide a response for the beach photo with the hypotheses such as the temperature in the 80s° F. with clear sky, moderate wind, and 3 ft waves.

Figure 3A:
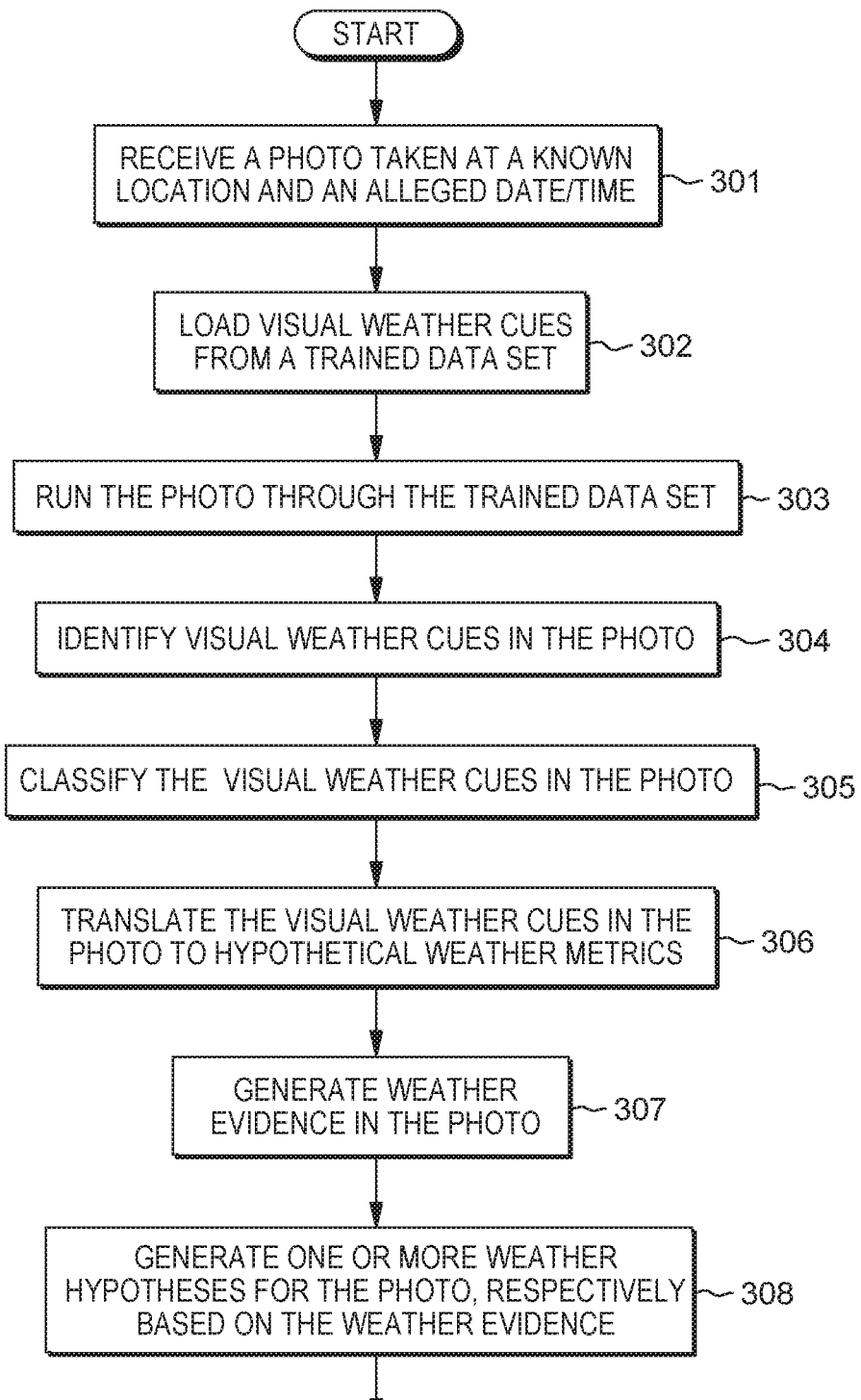
FIG. 3A and FIG. 3B present a flowchart showing operational steps for cognitive validation of date/time information corresponding to a photo based on weather information, in accordance with one embodiment of the present invention.
Figure 3B:
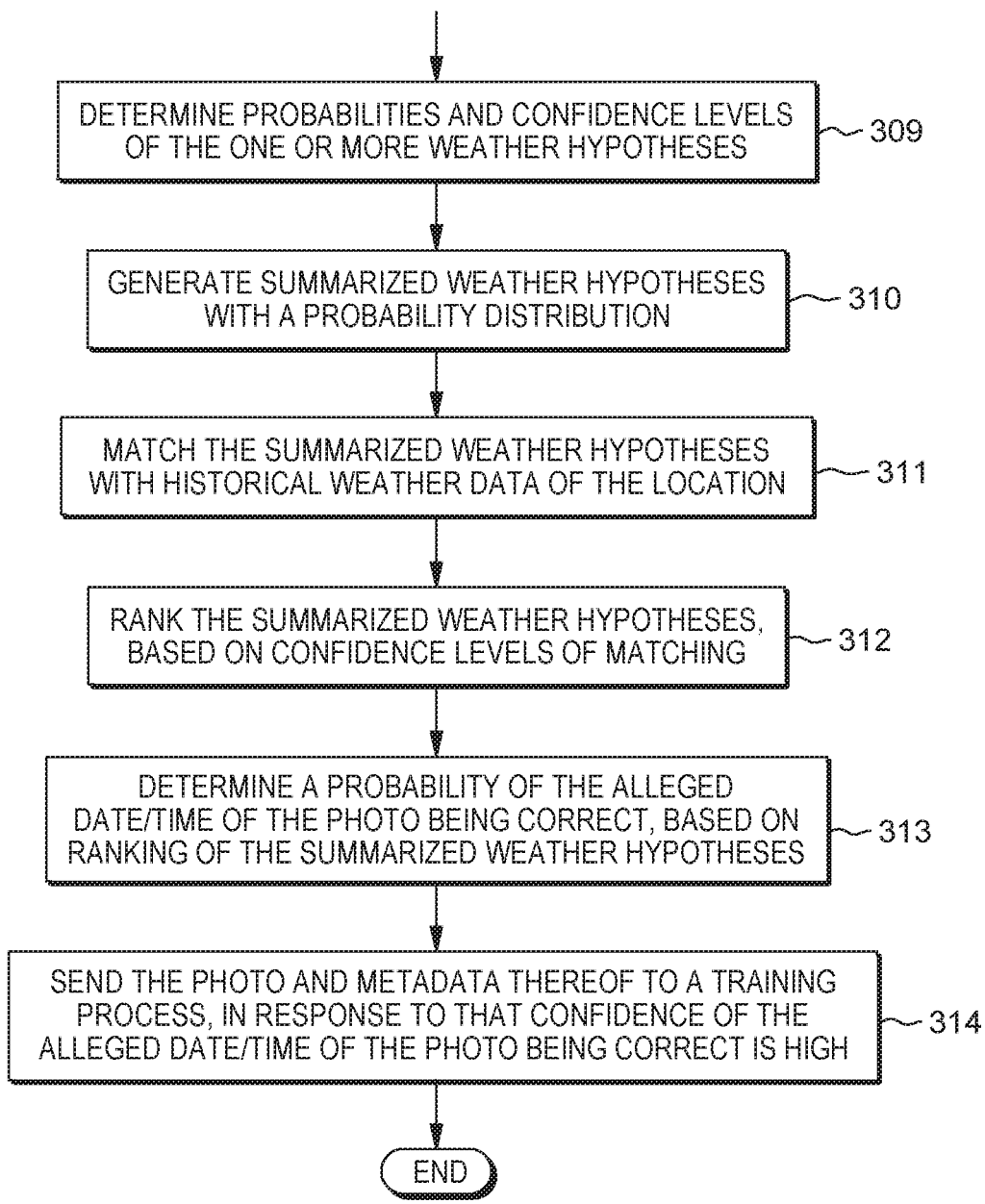

FIG. 3A and FIG. 3B present a flowchart showing operational steps for cognitive validation of date/time information corresponding to a photo based on weather information, in accordance with one embodiment of the present invention. The steps are implemented by a computer. At step 301, the computer receives a photo taken at a known location and an alleged date/time. For example, the date/time information corresponding to the photo is given in social media and alleged by one who publishes the photo in social media. The date/time information corresponding to the photo may also be included in metadata of the photo; however, the metadata including the date/time information may have been tampered. In one embodiment, step 301 is implemented by visual recognition module 210 (shown in FIG. 2).

At step 302, the computer loads visual weather cues from a trained data set. In one embodiment, visual recognition module 210 loads visual weather cues from trained data set 140 (shown in FIG. 1 and FIG. 2). Trained data set 140 of visual weather cues has been discussed in detail in previous paragraphs with reference to FIG. 1. Examples of the visual weather cues are given in Table 1 previously presented in this document.

At step 303, the computer runs the photo through the trained data set. The computer compares visual elements in the photo with the weather cues from the trained data set. In one embodiment, visual recognition module 210 runs the photo through trained data set 140 of visual weather cues.

At step 304, the computer identifies visual weather cues in the photo. At step 305, the computer classifies the visual weather cues in the photo. For example, as presented in Table 1, the visual weather cues are classified into categories of temperature, cloud coverage, precipitation, wind speed, and recent weather events. At step 306, the computer translates the visual weather cues in the photo to hypothetical weather metrics. For example, a visual weather cue in the photo showing that one is heavily dressed in the photo is translated to low temperature at the time the photo is taken; furthermore, the translation of the clothing visual clue is that temperature is between 20° F. and 30° F. with a 20% confidence, between 30° F. and 40° F. with a 70% confidence, and between 40° F. and 50° F. with a 10% confidence. At step 307, the computer generates weather evidence in the photo. In one embodiment, steps 304-307 are implemented by visual recognition module 210.

At step 308, the computer generates one or more weather hypotheses for the photo, respectively based on the weather evidence generated at step 307. In one embodiment, hypothesis generation and scoring module 220 (shown in FIG. 2) generates multiple parallel hypotheses, one hypothesis for one piece of weather evidence. At step 309, the computer determines probabilities and confidence levels of the one or more weather hypotheses. In one embodiment, step 309 is implemented by hypothesis generation and scoring module 220. For example, the one or more weather hypotheses for the photo may be as follows: temperature is low as 40° F. with a 80% confidence, it is sunny with a 60% confidence, and wind speed is 40 mph with a 70% confidence.

At step 310, the computer generates summarized weather hypotheses with a probability distribution. In one embodiment, the resulting multiple parallel hypotheses (generated at step 308) go through hypothesis synthesis module 230 (shown in FIG. 2) to generate the summarized weather hypotheses with the probability distribution.

At step 311, the computer matches the summarized weather hypotheses with historical weather data of the location. At this step, the computer evaluates confidence level of matching for each hypothesis and assigns scores to the hypotheses based on the confidence levels of matching. In one embodiment, matching module 240 (shown in FIG. 2) matches the summarized weather hypotheses with historical weather data 120 (shown in FIG. 1 and FIG. 2).

At step 312, the computer ranks the summarized weather hypotheses, based on the scores or the confidence levels. At step 313, the computer determines a probability of the alleged date/time of the photo being correct, based on ranking of the summarized weather hypotheses. The computer sends a response to the user to verify whether the alleged date/time given by the user is correct with an associated confidence. In one embodiment, steps 312 and 313 are implemented by confidence comparison and ranking module 250 (shown in FIG. 2).

At step 314, in response to that confidence of the alleged date/time of the photo being correct is high, the computer sends the photo and metadata thereof (or date/time information corresponding the photo) to a training process. In one embodiment, module 260 for feedback sends the photo and the date/time information to training 130 shown in FIG. 1; based on the feedback form module 260, trained data set 140 is updated.

Figure 4A:
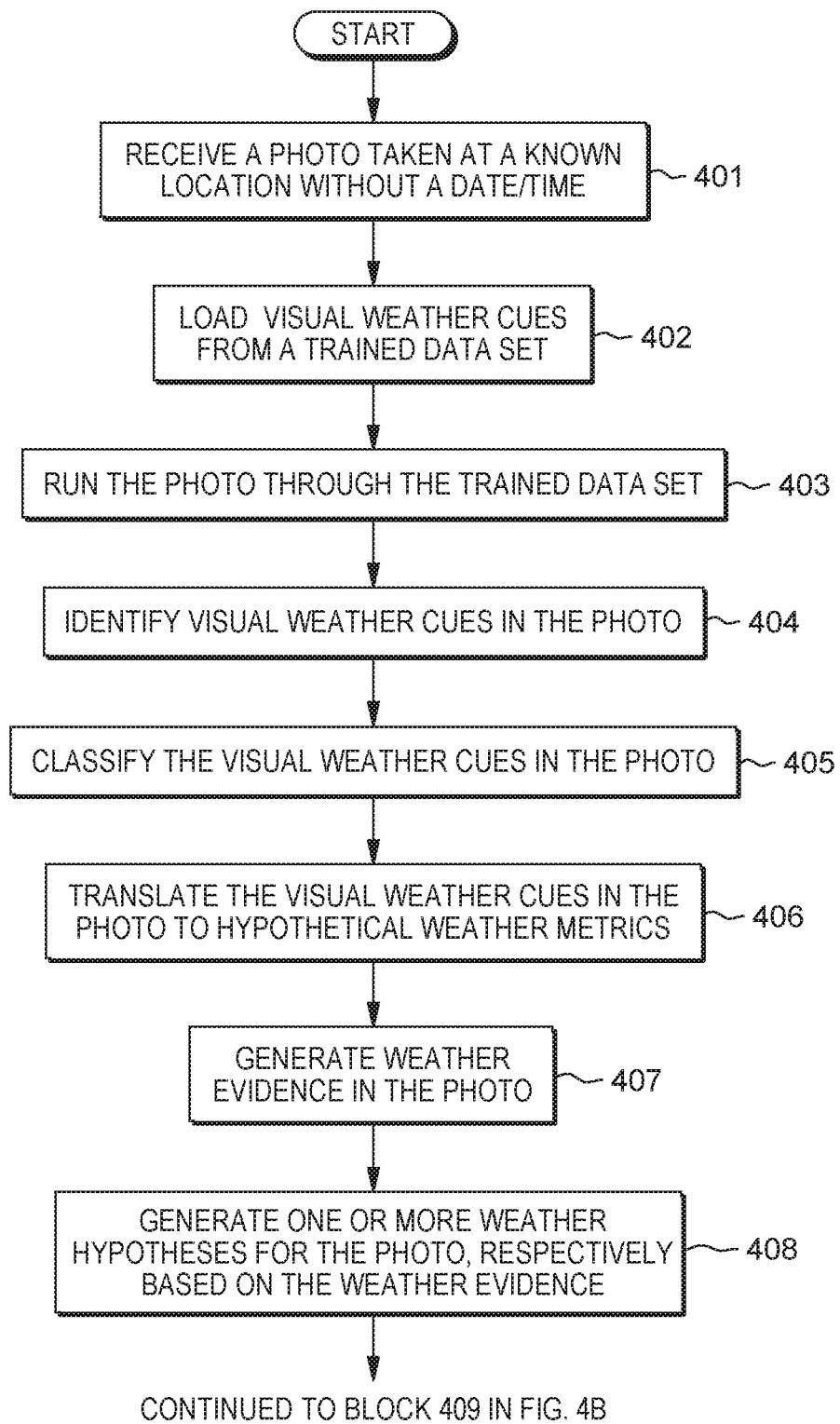
FIG. 4A and FIG. 4B present a flowchart showing operational steps for cognitive determination of date/time based on weather information, in accordance with one embodiment of the present invention.
Figure 4B:
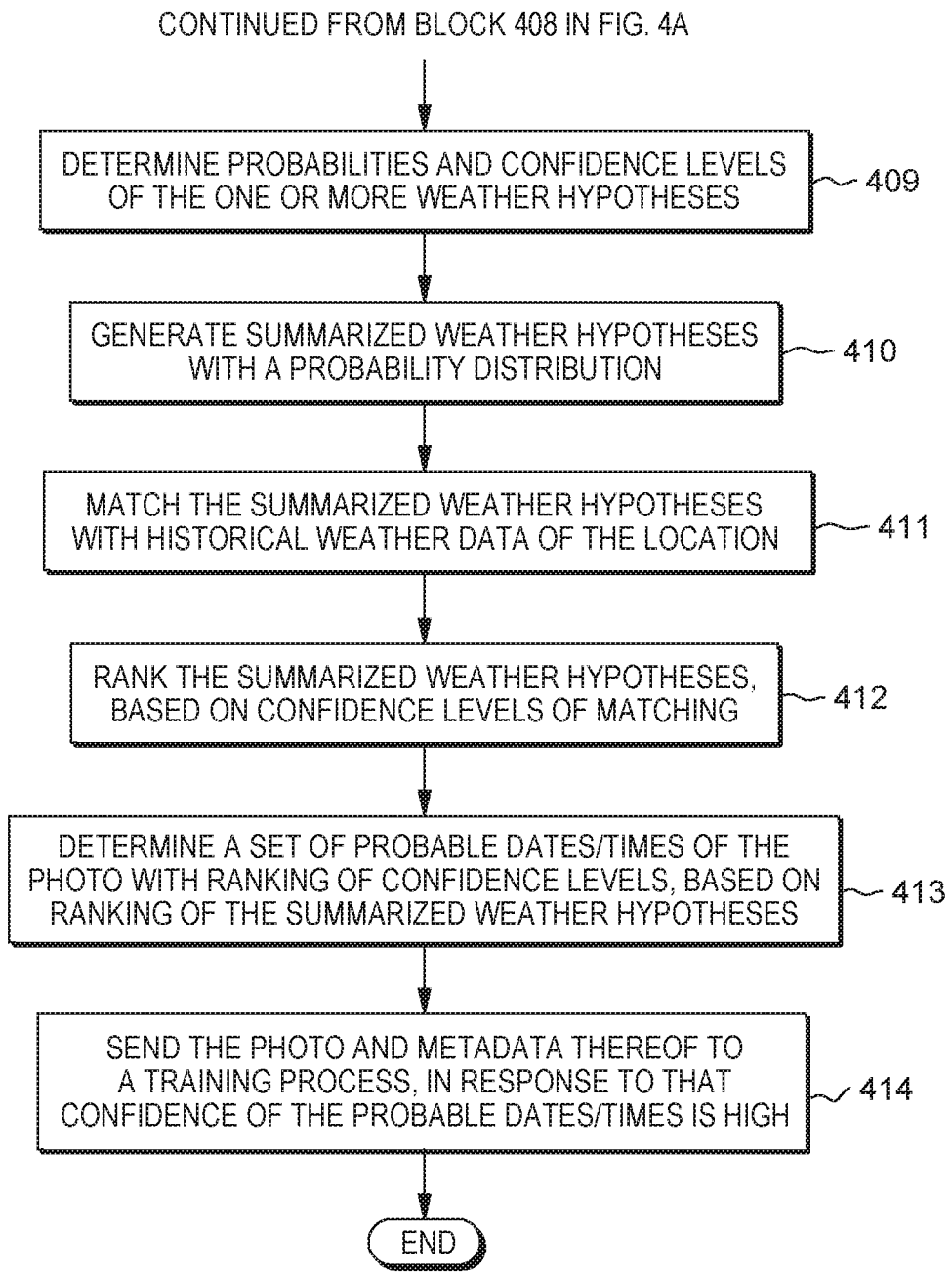

FIG. 4A and FIG. 4B present a flowchart showing operational steps for cognitive determination of date/time based on weather information, in accordance with one embodiment of the present invention. The steps are implemented by a computer. In this embodiment, a user provides a photo taken at a certain location; however, the user does not know a certain time when the photo has been taken and provides a time range when the photo has been taken. For example, the user does not remember the day the photo has been taken and knows the photo has been taken in a summer at a certain beach.

At step 401, the computer receives a photo taken at a known location without a certain date/time. A range of the date/time may be given. In one embodiment, step 401 is implemented by visual recognition module 210 (shown in FIG. 2). Steps 402-412 are the same as steps 302-312 described in previous paragraphs with reference to FIG. 3.

At step 413, the computer determines a set of probable dates/times of the photo, with ranking of confidence levels, based on ranking of the summarized weather hypotheses. The computer sends the user a response including the set of dates/times with associated confidences. In one embodiment, step 413 is implemented by confidence comparison and ranking module 250 (shown in FIG. 2).

At step 414, in response to that confidence of the probable dates/times is high, the computer sends the photo and date/time information corresponding the photo to a training process. In one embodiment, module 260 for feedback sends the photo and the date/time information to training 130 shown in FIG. 1; based on the feedback form module 260, trained data set 140 is updated.

Figure 5:
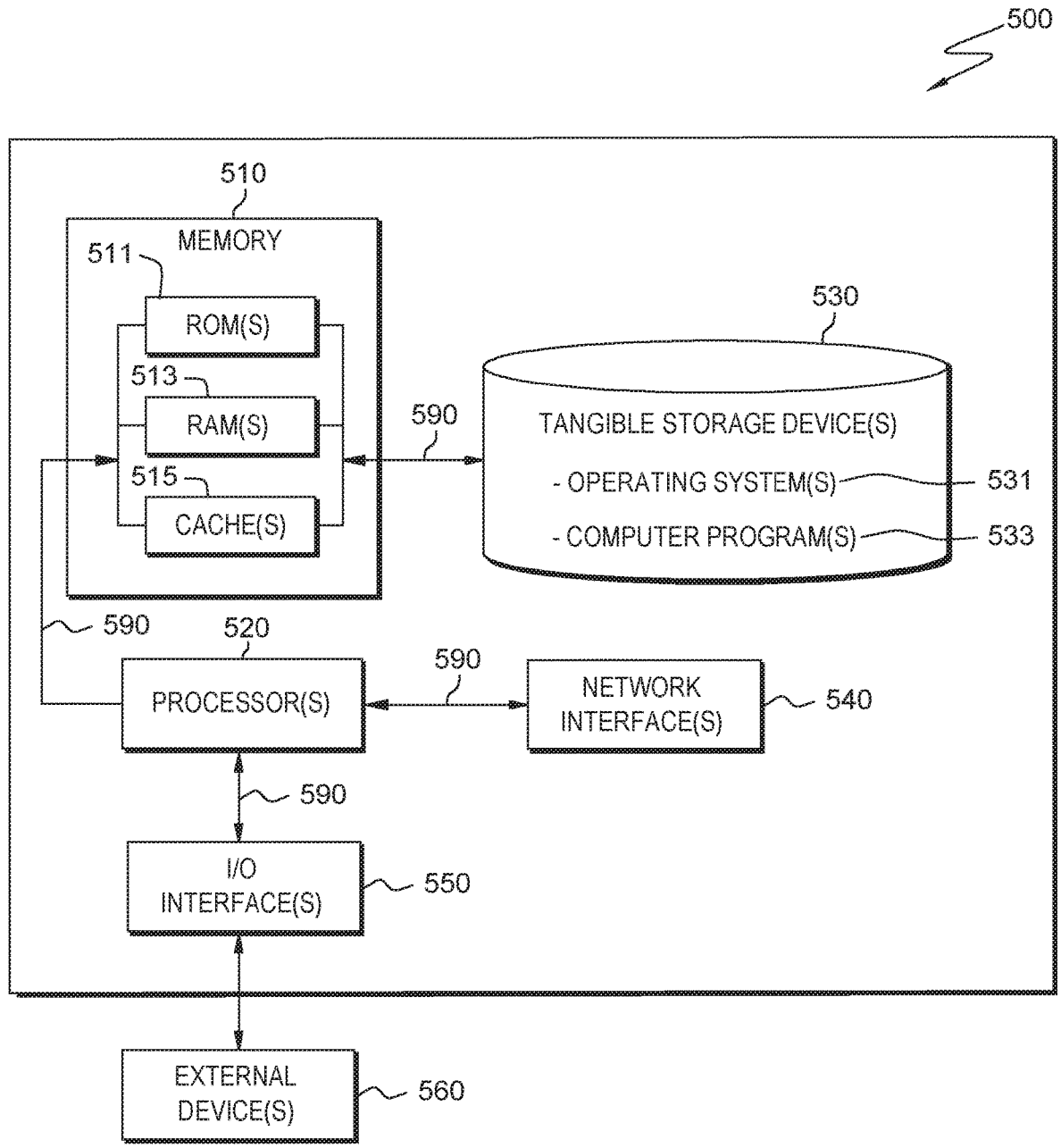
FIG. 5 is a diagram illustrating components of a computing device or a server for cognitive validation of date/time information corresponding to a photo based on weather information, in accordance with one embodiment of the present invention.

FIG. 5 is a diagram illustrating components of computing device or server 500 for cognitive validation of date/time information corresponding to a photo based on weather information, in accordance with one embodiment of the present invention. It should be appreciated that FIG. 5 provides only an illustration of one implementation and does not imply any limitations with regard to the environment in which different embodiments may be implemented.

Referring to FIG. 5, computing device 500 includes processor(s) 520, memory 510, and tangible storage device (s) 530. In FIG. 5, communications among the above-mentioned components of computing device 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computing device 500 further includes I/O interface(s) 550. I/O interface(s) 550 allows for input and output of data with external device(s) 560 that may be connected to computing device 500. Computing device 500 further includes network interface(s) 540 for communications between computing device 500 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the C programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
receiving, by a computer, training images with verified metadata;
receiving, by the computer, historical weather data;
identifying, by the computer, visual weather cues in the training images;
associating, by the computer, the visual weather cues with the historical weather data;
training, by the computer, a machine learning model to determine weather properties in images, by utilizing the training images with the verified metadata and the historical weather data;
storing, by the computer, training results in a trained data set;
receiving, by the computer, an image taken at a specific location and at an alleged time; and
verifying, by the computer, the alleged time, by using the machine learning model, wherein the machine learning model is used to determine weather properties in the image, wherein the machine learning model is used to compare the weather properties in the image to known weather information at the specific location and at the alleged time.

2. The method of claim 1, wherein verifying the alleged time comprises:
comparing, by the computer, visual elements in the image with the visual weather cues from the trained data set;
generating, by the computer, weather evidence in the image;
generating, by the computer, one or more weather hypotheses for the image, based on the weather evidence;
generating, by the computer, summarized weather hypotheses with a probability distribution, based on probabilities and confidence levels of the one or more weather hypotheses;
matching, by the computer, the summarized weather hypotheses with historical weather data at the specific location;
ranking, by the computer, the summarized weather hypotheses, based on confidence levels of the matching;
determining, by the computer, a probability of the alleged time of the image being correct, based on the ranking; and sending, by the computer, a response to a user to verify whether the alleged time is correct with an associated confidence.

3. The method of claim 2, further comprising:
sending, by the computer, the image and time information corresponding to the image to a process of training the machine learning model, in response to that the associated confidence of the alleged time of the image being correct is high.

4. The method of claim 2, further comprising:
identifying, by the computer, visual weather cues in the image;
classifying, by the computer, the visual weather cues in the image into categories of various weather properties; and
translating, by the computer, the visual weather cues to weather metrics.

5. The method of claim 1, wherein training the machine learning model further comprises:
receiving, by the computer, the image and time information corresponding to the image, in response to that an associated confidence of the alleged time of the image being correct is high; and
updating, by the computer, the trained data set, with the visual weather cues in the image.

6. A computer program product comprising one or more computer-readable tangible storage devices and program instructions stored on at least one of the one or more computer-readable tangible storage devices, the program instructions executable to:
receive, by a computer, training images with verified metadata;
receive, by the computer, historical weather data;
identify, by the computer, visual weather cues in the training images;
associate, by the computer, the visual weather cues with the historical weather data;
train, by the computer, a machine learning model to determine weather properties in images, by utilizing the training images with the verified metadata and the historical weather data;
store, by the computer, training results in a trained data set;
receive, by the computer, an image taken at a specific location and at an alleged time; and
verify, by the computer, the alleged time, by using the machine learning model, wherein the machine learning model is used to determine weather properties in the image, wherein the machine learning model is used to compare the weather properties in the image to known weather information at the specific location and at the alleged time.

7. The computer program product of claim 6, wherein the program instructions executable to verify the alleged time comprise program instructions executable to:
compare, by the computer, visual elements in the image with the visual weather cues from the trained data set;
generate, by the computer, weather evidence in the image;
generate, by the computer, one or more weather hypotheses for the image, based on the weather evidence;
generate, by the computer, summarized weather hypotheses with a probability distribution, based on probabilities and confidence levels of the one or more weather hypotheses;
match, by the computer, the summarized weather hypotheses with historical weather data at the specific location;
rank, by the computer, the summarized weather hypotheses, based on confidence levels of matching the summarized weather hypotheses with historical weather data at the location;
determine, by the computer, a probability of the alleged time of the image being correct, based on ranking the summarized weather hypotheses; and
send, by the computer, a response to a user to verify whether the alleged time is correct with an associated confidence.

8. The computer program product of claim 7, further comprising program instructions executable to:
send, by the computer, the image and time information corresponding to the image to a process of training the machine learning model, in response to that the associated confidence of the alleged time of the image being correct is high.

9. The computer program product of claim 7, further comprising program instructions executable to:
identify, by the computer, visual weather cues in the image;
classify, by the computer, the visual weather cues in the image into categories of various weather properties; and
translate by the computer, the visual weather cues to weather metrics.

10. The computer program product of claim 6, wherein the program instructions executable to train the machine learning model further comprise program instructions executable to:
receive, by the computer, the image and time information corresponding to the image, in response to that an associated confidence of the alleged time of the image being correct is high; and
update, by the computer, the trained data set, with the visual weather cues in the image.

11. A computer system comprising:
one or more processors, one or more computer readable tangible storage devices, and program instructions stored on at least one of the one or more computer readable tangible storage devices for execution by at least one of the one or more processors, the program instructions executable to:
receive, by a computer, training images with verified metadata;
receive, by the computer, historical weather data;
identify, by the computer, visual weather cues in the training images;
associate, by the computer, the visual weather cues with the historical weather data;
train, by the computer, a machine learning model to determine weather properties in images, by utilizing the training images with the verified metadata and the historical weather data;
store, by the computer, training results in a trained data set;
receive, by the computer, an image taken at a specific location and at an alleged time; and
verify, by the computer, the alleged time, by using the machine learning model, wherein the machine learning model is used to determine weather properties in the image, wherein the machine learning model is used to compare the weather properties in the image to known weather information at the specific location and at the alleged time.

12. The computer system of claim 11, wherein the program instructions executable to verify the alleged time comprise program instructions executable to:
- compare, by the computer, visual elements in the image with the visual weather cues from the trained data set;
- generate, by the computer, weather evidence in the image;
- generate, by the computer, one or more weather hypotheses for the image, based on the weather evidence;
- generate, by the computer, summarized weather hypotheses with a probability distribution, based on probabilities and confidence levels of the one or more weather hypotheses;
- match, by the computer, the summarized weather hypotheses with historical weather data at the specific location;
- rank, by the computer, the summarized weather hypotheses, based on confidence levels of matching the summarized weather hypotheses with historical weather data at the location;
- determine, by the computer, a probability of the alleged time of the image being correct, based on ranking the summarized weather hypotheses; and
- send, by the computer, a response to a user to verify whether the alleged time is correct with an associated confidence.

13. The computer system of claim 12, further comprising program instructions executable to:
- send, by the computer, the image and time information corresponding to the image to a process of training the machine learning model, in response to that the associated confidence of the alleged time of the image being correct is high.

14. The computer system of claim 12, further comprising program instructions executable to:
- identify, by the computer, visual weather cues in the image;
- classify, by the computer, the visual weather cues in the image into categories of various weather properties; and
- translate by the computer, the visual weather cues to weather metrics.

15. The computer system of claim 11, wherein the program instructions executable to train the machine learning model further comprise program instructions executable to:
- receive, by the computer, the image and time information corresponding to the image, in response to that an associated confidence of the alleged time of the image being correct is high; and
- update, by the computer, the trained data set, with the visual weather cues in the image.

* * * * *